(12) United States Patent
Kaushik et al.

(10) Patent No.: US 9,328,229 B2
(45) Date of Patent: May 3, 2016

(54) POLYMER COMPOSITION AND ARTICLES FOR USE IN LOW TEMPERATURE ENVIRONMENTS THAT ARE WEAR RESISTANT

(71) Applicant: Ticona LLC, Florence, KY (US)

(72) Inventors: Mukul Kaushik, Florence, KY (US); Dirk Zierer, Hofheim (DE); Kenneth Leon Price, Florence, KY (US); James Louis Coleman, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 345 days.

(21) Appl. No.: 13/801,394

(22) Filed: Mar. 13, 2013

(65) Prior Publication Data

US 2013/0298427 A1    Nov. 14, 2013

Related U.S. Application Data

(60) Provisional application No. 61/849,814, filed on May 9, 2012.

(51) Int. Cl.
*C08L 23/06* (2006.01)
*C08L 47/00* (2006.01)
(Continued)

(52) U.S. Cl.
CPC . *C08L 23/06* (2013.01); *A43B 5/04* (2013.01); *C08L 33/068* (2013.01); *C08L 35/02* (2013.01);
(Continued)

(58) Field of Classification Search
CPC ......... C08L 53/02; C08L 67/02; C08L 75/04; C08L 2205/08; C08L 2205/18; C08L 2205/035; C08L 2207/068; C08L 23/06; C08L 33/068; C08L 35/02; C08L 47/00; A43B 5/04

USPC ........ 36/87, 115, 117.1, 117.2; 525/123, 176, 525/177
See application file for complete search history.

(56) References Cited

U.S. PATENT DOCUMENTS 3,047,539 A    7/1962    Pengilly
4,180,494 A    12/1979   Fromuth et al.
(Continued)

FOREIGN PATENT DOCUMENTS

CH    655941 A5    5/1986
EP    0152049 A2   8/1985
(Continued)

OTHER PUBLICATIONS

Kaushik, et al., U.S. Appl. No. 13/945,444, filed Jul. 18, 2013, Wear Resistant Thermoplastic Copolyester Elastomer.
(Continued)

*Primary Examiner* — Randy Gulakowski
*Assistant Examiner* — Christopher M Rodd
(74) *Attorney, Agent, or Firm* — Dority & Manning, P.A.

(57) ABSTRACT

Ski boots and other cold weather articles are described made from polymer compositions that are exceptionally stable at low temperatures. The polymer composition, for instance, may contain a thermoplastic polymer, a thermoplastic elastomer, an impact modifier and a wear resistant additive. In one embodiment, various polymer components are selected such that they do not undergo a second order transition within a temperature range of from about 50° C. to about −40° C., and particularly from about 23° C. to about −40° C. In one embodiment, the polymer compositions are used to mold the outer shell of a snow ski boot.

26 Claims, 2 Drawing Sheets

(51) Int. Cl.
  *A43B 5/04* (2006.01)
  *C08L 75/04* (2006.01)
  *C08L 35/02* (2006.01)
  *C08L 33/06* (2006.01)
  *C08L 67/03* (2006.01)
  *C08L 67/00* (2006.01)
  *C08L 53/02* (2006.01)
  *C08L 67/02* (2006.01)

(52) U.S. Cl.
  CPC ............... *C08L 47/00* (2013.01); *C08L 53/02* (2013.01); *C08L 67/00* (2013.01); *C08L 67/02* (2013.01); *C08L 67/03* (2013.01); *C08L 75/04* (2013.01); *C08L 2205/035* (2013.01); *C08L 2205/08* (2013.01); *C08L 2205/18* (2013.01); *C08L 2207/068* (2013.01)

(56) References Cited

U.S. PATENT DOCUMENTS

| | | | |
|---|---|---|---|
| 4,369,280 A | | 1/1983 | Dieck et al. |
| 4,469,851 A | | 9/1984 | Charles et al. |
| 4,548,978 A | | 10/1985 | Garrison, Jr. |
| 4,670,508 A | * | 6/1987 | Ohdaira et al. ............ 525/64 |
| 4,753,986 A | * | 6/1988 | Wang ....................... 525/64 |
| 4,983,660 A | | 1/1991 | Yoshida et al. |
| 5,114,998 A | | 5/1992 | Golder et al. |
| 5,123,183 A | | 6/1992 | Paris et al. |
| 5,219,933 A | | 6/1993 | Henton et al. |
| 5,237,000 A | * | 8/1993 | Lausberg et al. ............ 525/64 |
| 5,283,295 A | | 2/1994 | Light et al. |
| 5,308,894 A | | 5/1994 | Laughner |
| 5,331,044 A | | 7/1994 | Lausberg et al. |
| 5,409,967 A | | 4/1995 | Carson et al. |
| 5,475,046 A | | 12/1995 | Son et al. |
| 5,700,881 A | | 12/1997 | Wagner et al. |
| 5,859,119 A | | 1/1999 | Hoefflin |
| 5,889,102 A | | 3/1999 | Haack et al. |
| 5,941,194 A | | 8/1999 | Potente |
| 5,977,229 A | | 11/1999 | Barth et al. |
| 5,977,299 A | | 11/1999 | Annunziato et al. |
| 6,329,031 B1 | | 12/2001 | Kitagawa et al. |
| 6,616,918 B2 | | 9/2003 | Candau et al. |
| 7,524,562 B2 | * | 4/2009 | Tamaki et al. ............ 428/412 |
| 7,767,781 B2 | * | 8/2010 | Phelps et al. ............ 528/272 |
| 2002/0088146 A1 | * | 7/2002 | Joseph et al. ............ 36/117.3 |
| 2003/0229155 A1 | * | 12/2003 | Wang et al. ............ 522/3 |
| 2004/0039118 A1 | | 2/2004 | Chirgott |
| 2006/0293416 A1 | | 12/2006 | Peters et al. |
| 2008/0103257 A1 | | 5/2008 | Tokuyama et al. |
| 2009/0181199 A1 | | 7/2009 | Agarwal et al. |
| 2009/0223955 A1 | | 9/2009 | Maziers |
| 2011/0034612 A1 | | 2/2011 | Lyons et al. |
| 2011/0180300 A1 | | 7/2011 | Gu et al. |

FOREIGN PATENT DOCUMENTS

| | | |
|---|---|---|
| EP | 0237306 | 9/1987 |
| EP | 0279808 A2 | 8/1988 |
| EP | 0443457 | 8/1991 |
| WO | WO 86/04913 | 8/1986 |
| WO | WO 9617019 | 6/1996 |

OTHER PUBLICATIONS

Kaushik, et al., U.S. Appl. No. 13/721,160, filed Dec. 20, 2012, Molded Polymer Articles for Use in Low Temperatures Having a Low Rigidity Factor.
International Search Report and Written Opinion, PCT/US2013/030839, mailed May 22, 2013.
Citation of Related Applications Form.
International Search Report for Appl. No. PCT/US2012/070793, May 27, 2003.
XP002696765; Thomson Scientific, London, GB, Nov. 28, 1995.

* cited by examiner

POLYMER COMPOSITION AND ARTICLES FOR USE IN LOW TEMPERATURE ENVIRONMENTS THAT ARE WEAR RESISTANT

RELATED APPLICATIONS

This application claims filing benefit of U.S. Provisional Patent Application Ser. No. 61/849,814, filed on May 9, 2012, and which is incorporated herein in its entirety.

BACKGROUND

Many polymer articles are designed for use in cold weather applications. Such polymer articles include machine parts, housings and covers, sports equipment and the like. For example, high performance snow ski boots are made from polymer compositions that are intended to have good impact resistance properties at colder temperatures so that the boots will not crack or otherwise fail during use.

In the past, various problems have arisen in designing high performance snow ski boots. For instance, problems have arisen in attempting to formulate polymer compositions having excellent impact resistance properties at lower temperatures without compromising other properties of the material. Consequently, further improvements are needed in formulating compositions used for producing cold weather sports equipment, such as ski boots. Increasing the impact resistance properties of the polymer composition especially at lower temperatures will allow designers of ski boots to make the walls of the ski boot thinner, thereby not only reducing the weight of the product but also increasing the performance.

Another problem that has been faced by ski boot manufacturers is the ability to produce polymer compositions whose physical properties remain constant over a wide temperature range. For example, since thermoplastic polymers exhibit temperature-dependent behavior, ski boots have a tendency to vary in stiffness, in feel, and in performance as the temperature of the environment changes. For example, the same ski boot may perform differently at a temperature of 0° C. in comparison to at a temperature at −10° C. These differences are very noticeable to a high level skier. In fact, many snow skiers who compete at high levels are known to bury their ski boots in the snow when air temperatures increase in order to increase stiffness and obtain consistent performance out of the ski boot. Small property changes in the ski boot can have a significant impact on a ski competitor's performance, especially when many contests are decided by a fraction of a second.

In view of the above, a need currently exists for an improved polymer composition for use in cold weather environments. In particular, a need exists for molded articles made from a polymer composition that not only has excellent impact resistance properties but also displays stable modulus properties over a broad temperature range.

A need also exists for a polymer composition having good low temperature physical properties in addition to being abrasion resistant. Abrasion resistant properties are especially important for sports equipment used in cold environments. Further, improving the abrasion resistance of a polymer composition may have a tendency to adversely affect the impact properties of the composition, especially at cold temperatures. Consequently, a need exists for a polymer composition that not only is stable at cold temperatures but is also abrasion resistant.

SUMMARY

In general, the present disclosure is directed to molded articles made from polymer compositions that are well suited for use in low temperature environments. The polymer composition of the present disclosure is made from a combination of polymers that results in molded articles having very stable physical properties at temperatures less than about 40° C., such as at temperatures less than about 23° C., such as at temperatures from about 23° C. to about −40° C. In particular, the polymer components used to formulate the composition each can be selected such that none of the components or only a minor amount of components undergo a second order transition within a temperature range of from about 40° C. to about −40° C.

Various different articles can be made in accordance with the present disclosure. The articles may comprise industrial parts that are used in low temperature environments. In other embodiments, molded articles made according to the present disclosure may include high performance sports equipment for use in winter activities, such as skating and skiing. In one particular embodiment, for instance, the present disclosure is directed to a snow ski boot that includes an outer shell molded from a polymer composition made in accordance with the present disclosure.

In one embodiment, for instance, the present disclosure is directed to a boot comprising a rigid outer shell and a lining placed adjacent to an interior surface of the outer shell. The outer shell and the lining define an opening for receiving the foot of a wearer. In accordance with the present disclosure, the rigid outer shell is formed from a molded polymer composition. The polymer composition comprises a thermoplastic polymer, at least one thermoplastic elastomer, an additive for wear resistance and at least one impact modifier. In accordance with the present disclosure, the polymer composition displays a rigidity factor of about 2 or less, such as about 1.5 or less, such as even about 1.2 or less. The rigidity factor is calculated by dividing the flexural modulus of the polymer composition at −20° C. by the flexural modulus of the composition at 23° C. Having a low rigidity factor indicates that the polymer composition is stable over a wide range of lower temperatures.

In addition to having excellent low temperature performance characteristics, the polymer composition of the present disclosure can also be formulated so as to have good wear resistance properties. In particular, the polymer composition can be formulated so as to be abrasion resistant. For instance, in one embodiment, when tested according to Abrasion Resistance Test DIN 53516 on a DIN abrader (Model 6102, Zwick Abrasion Tester), a shaped specimen can display a volume loss of less than about 100 $mm^3$, such as less than about 95 $mm^3$, such as less than about 90 $mm^3$, such as less than about 85 $mm^3$, such as less than about 80 $mm^3$, such as less than about 75 $mm^3$, such as less than about 70 $mm^3$.

In one embodiment, the thermoplastic polymer contained in the polymer composition comprises a non-elastomeric polymer, such as a polyester polymer. For instance, the thermoplastic polymer may comprise polybutylene terephthalate, polyethylene terephthalate, or mixtures thereof. In an alternative embodiment, the thermoplastic polymer may comprise a polycarbonate alone or in combination with a polyester polymer.

When using a polyester polymer, in one embodiment, the polyester polymer may be formed so as to have a lower amount of carboxylic acid end groups. For instance, the polyester polymer may contain less than about 30 mmol/kg of carboxylic end groups, such as less than about 20 mmol/kg, such as less than about 12 mmol/kg of carboxylic end groups. Minimizing the amount of carboxylic end groups increases moisture resistance and increases hydrolytic stability.

In addition to a non-elastomeric polymer, the polymer composition may contain one or more thermoplastic elastomers. In one embodiment, for instance, the polymer composition may contain a thermoplastic polyester elastomer (TPE-E), such as a copolyesters elastomer (COPE). In an alternative embodiment, the polymer composition may contain a thermoplastic polyurethane elastomer (TPU) either alone or in combination with a thermoplastic polyester elastomer. The thermoplastic polyurethane elastomer may be aliphatic and may have a Shore A hardness of less than about 95, such as less than about 85, such as even less than about 70.

The polymer composition may also contain one or more impact modifiers. The impact modifier, in one embodiment, has a core and shell construction. The core can comprise a crosslinked diene-based elastomer while the shell may comprise a thermoplastic polymer such as a methacrylate polymer. In one embodiment, the impact modifier has a methyl-methacrylate-butadiene-styrene construction.

In another embodiment, the polymer composition may contain a reactive modifier that may serve as an impact modifier and/or as a reactive compatibilizer. The reactive modifier may react with one or more components in the composition. Reactive impact modifiers that may be used include ethylene-maleic anhydride copolymers, ethylene-alkyl (meth)acrylate-maleic anhydride copolymers, ethylene-alkyl (meth) acrylate-glycidyl (meth)acrylate copolymers, and the like (e.g. Lotader AX8840, RX9840, AX8900, AX8950, etc.).

Other reactive impact modifiers that may be used, have a core and shell construction, with reactive groups on the shell. The core can comprise a crosslinked diene-based elastomer while the shell may comprise a thermoplastic polymer such as a functionalized methacrylate co-polymer. In one embodiment, the impact modifier has a glycidyl methacrylate/methylmethacrylate-butadiene-styrene construction (e.g. Durastrength 400R).

In order to improve wear resistance, the polymer composition may also contain an ultra-high molecular weight polyethylene. The ultra-high molecular weight polyethylene may be present in the composition in the form of particles having a particle size such that the mean particle diameter of the particles is from about 20 microns to about 120 microns. In one embodiment, the ultra-high molecular weight polyethylene may comprise hydrophilized particles. Using hydrophilized particles, for instance, may improve abrasion resistance without adversely affecting cold temperature impact properties. The ultra-high molecular weight polyethylene may be hydrophilized by being plasma treated.

In one particular embodiment, the polymer composition comprises a non-elastomeric polyester polymer present in an amount from about 15% to about 65% by weight, an impact modifier as described above being present in an amount from about 10% to about 30% by weight, and a thermoplastic polyester elastomer being present in an amount from about 10% to about 40% by weight. In addition to the above, an ultra-high molecular weight polyethylene may be present in the composition in an amount from about 0.5% to about 10% by weight. The polymer composition may also contain a thermoplastic polyurethane elastomer in an amount from about 0.1% to about 10% by weight. A reactive modifier may be present in the composition in an amount up to about 8% by weight.

In addition to the above components, an additional non-elastomeric thermoplastic polymer may be optionally added to the composition in order to improve printability. The additional polymer may comprise a polycarbonate polymer, a non-elastic copolyester, or an amorphous polyester. Such polyesters include glycol-modified polyethylene terephthalate (PETG), an isophthalic acid-modified polyethylene terephthalate (PETA), a glycol-modified poly(1,4-cyclohexanedimethanol terephthalate) (PCTG), or isophthalic acid-modified poly(1,4-cyclohexandimethanol terephthalate) (PCTA). A polycarbonate polymer or a polyester polymer may be selected that does not undergo a second order transition within a temperature range of from 40° C. to about −40° C. One or more of the above additional thermoplastic polymers may be present in the composition in an amount from about 5% to about 15% by weight in order to improve printability.

Various different products may be formed with the polymer composition of the present disclosure. In one embodiment, for instance, the polymer composition may be used to form a boot. The boot may comprise a snow ski boot and may include a sole defining at least one flange for attachment to ski bindings. In one embodiment, the outer shell of the boot includes a boot portion and a separate cuff portion.

In addition to snow ski boots, however, it should be understood that various other molded articles may be made in accordance with the present disclosure. For instance, the boot may also be part of ice skates, including hockey skates.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
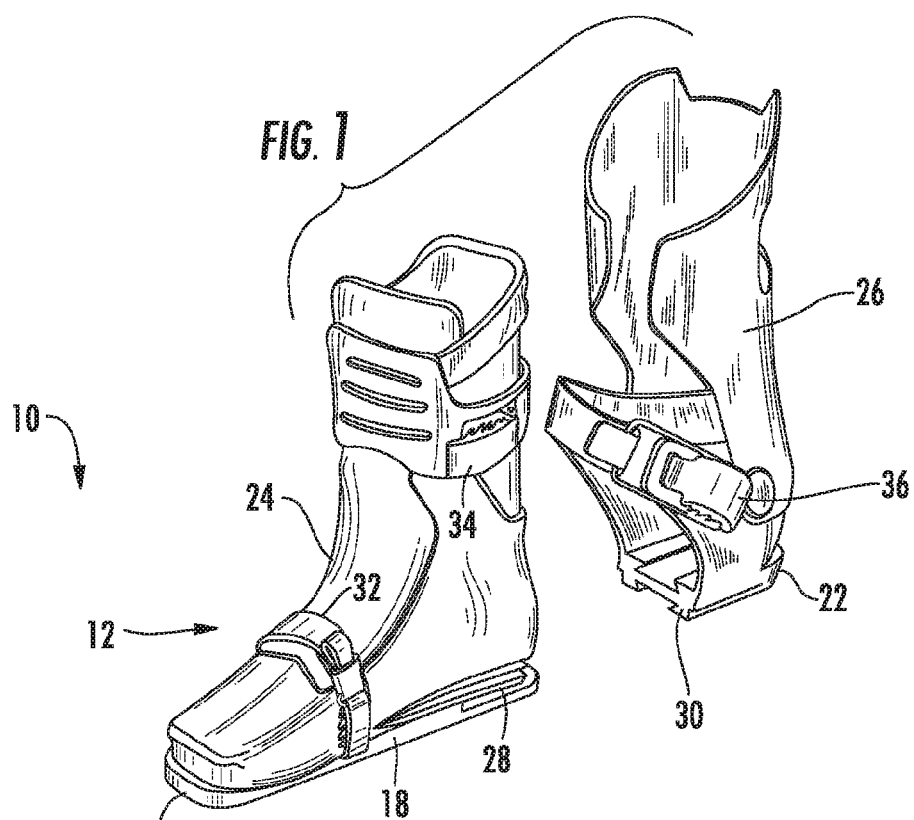
FIG. 1 is a perspective view of one embodiment of a snow ski boot made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition and molded polymer articles that are well suited for use in low temperature environments. More particularly, the molded articles of the present disclosure are well suited for use at temperatures below 0° C. in high performance applications. In one embodiment, for instance, the molded article may comprise the outer shell of a snow boot, and particularly a snow ski boot. As will be described in greater detail below, polymer compositions formulated in accordance with the present disclosure have very stable properties over a relatively large temperature range that includes temperatures below freezing.

In general, the polymer composition of the present disclosure comprises a thermoplastic polymer that may be characterized as non-elastomeric and is provided in the composition for providing rigidity and stability. The thermoplastic polymer is generally present in the polymer composition in an amount sufficient to form a continuous phase when the composition is molded into an article. In addition to a thermoplastic polymer, the polymer composition can contain various other components depending upon the particular application and the desired result. For instance, the polymer composition can contain at least one thermoplastic elastomer and/or at least one impact modifier. In addition, the polymer composition may contain at least one additive that provides wear resistance and particularly abrasion resistance. The different components can be formulated so as to produce a polymer composition that does not significantly change properties at low temperatures. In addition, the polymer composition can be formulated so as to have good impact resistance properties while also being abrasion resistant. As will be described in greater detail below, the above components can be combined together in a manner that can produce a polymer composition having a rigidity factor of 2 or less, such as 1.5 or less, such as 1.3 or less.

The rigidity factor of a polymer composition is calculated by dividing the flexural modulus of the polymer composition at −20° C. by the flexural modulus of the composition at 23° C. As used herein, the flexural modulus is determined according to ISO Test 178. The rigidity factor is an indication of the temperature dependent behavior of the polymer composition at lower temperatures. A rigidity factor of less than 2 is an indication that the polymer composition is stable at lower temperatures over a wide temperature range and does not significantly change in stiffness or performance.

In order to produce a polymer composition having a rigidity factor of about 2 or less, the different components contained in the polymer composition of the present disclosure are selected based upon their individual properties. In particular, in one embodiment, the thermoplastic polymer, a thermoplastic elastomer, and an impact modifier are selected such that none of the above polymers undergo a glass transition or undergo any other second order transition at a temperature range of from about 50° C. to about −40° C., and particularly from about 37° C. to about −30° C.

In addition to the above, the particular polymer components contained in the polymer composition may also be selected such that they are not hygroscopic. For instance, in one embodiment, the non-elastomeric thermoplastic polymer contained in the composition absorbs less than 0.5% by weight moisture at equilibrium, and particularly less than about 0.4% by weight moisture at equilibrium. In this regard, thermoplastic polymers well suited for use in the present disclosure include polymers that do not undergo second order transitions at lower temperatures and that do not possess significant amounts of hydrogen bonding that can increase moisture absorption.

The polymer composition can be molded into any suitable shape. For instance, the polymer composition can be used in an injection molding process. Polymer articles made in accordance with the present disclosure are particularly well suited for use in low temperature environments, such as in environments where the temperature range is from 23° C. to about −40° C., and particularly from about 0° C. to about −20° C. Within the above range, the physical properties of the polymer composition remain extremely stable. For instance, the stiffness of the polymer does not appreciably change over the above temperature range, which is indicated by the rigidity factor described above.

Polymer articles that can be made in accordance with the present disclosure include sporting equipment that is used in low temperature environments, such as sporting equipment used in winter sports activities. In addition, the polymer composition may be used to produce industrial equipment that is intended to withstand colder outside temperatures or may be designed to be used in refrigerated processes. For instance, due to the chemical resistance of the composition, the polymer composition may be used to produce agricultural equipment, irrigation equipment, and the like that is intended to withstand colder outside temperatures. For example, the equipment may include, but is not limited to, a conveyor belt, components for sprinklers, connection devices such as valves, and the like.

The polymer composition may also be used to produce molded snow removal equipment, such as snow shovels and the like. The polymer composition may also be used to produced molded parts for a snowmobile.

In one embodiment, the polymer composition is used to produce molded boots, and particularly boots for use in cold weather applications. For instance, the boots may be incorporated into ice skates including hockey skates. In one embodiment, the polymer composition is used to produce molded snow shoes.

Figure 2:
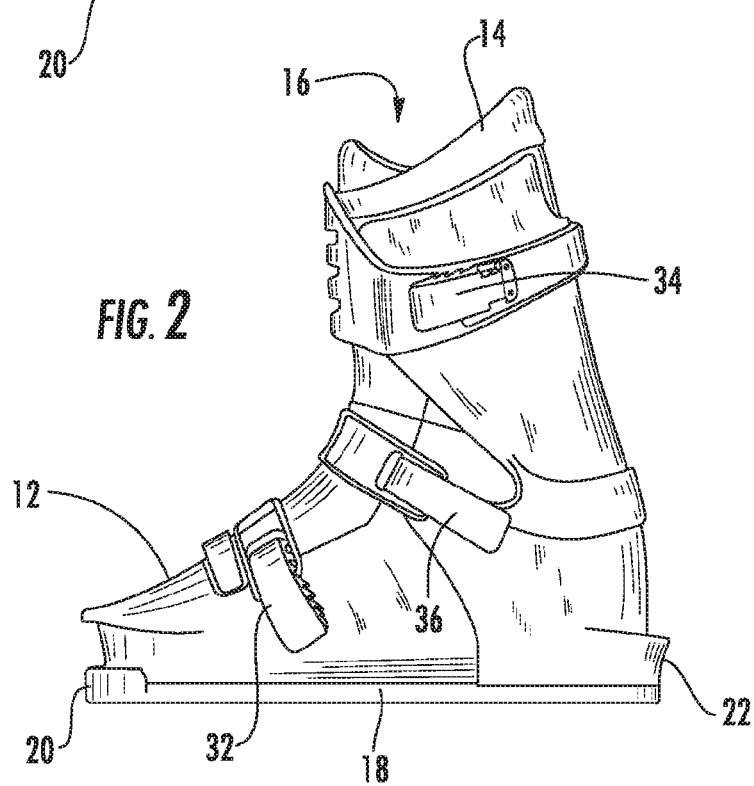
FIG. 2 is a side view of the snow ski boot illustrated in FIG. 1.

In one particular embodiment, as shown in the figures, the polymer composition may be used to produce snow skiing boots. Referring to FIGS. 1 and 2, for instance, one embodiment of a ski boot 10 made in accordance with the present disclosure is shown. The ski boot 10 includes a rigid outer shell 12 made from a polymer composition in accordance with the present disclosure. The outer shell 12 includes an exterior surface and an interior surface. The interior surface may be placed adjacent to a lining 14. The lining 14 may be permanently attached to the outer shell 12 or may be removable from the outer shell. The outer shell 12 and the lining 14 of the ski boot 10 defines an opening 16 for receiving the foot of a wearer.

As shown in FIGS. 1 and 2, the outer shell 12 forms a sole 18. The sole 18 has a shape configured to engage the bindings of a ski. In particular, the sole 18 includes a front flange 20 and a back flange 22. The flanges 20 and 22 can have any suitable shape such that they will cooperate with bindings on a ski and releasably detach from the skis should the skier fall during use.

In the embodiment illustrated in FIGS. 1 and 2, the outer shell 12 of the ski boot 10 is made from two separate pieces. In particular, the outer shell 12 includes a boot portion 24 and a cuff portion 26. The boot portion 24 and the cuff portion 26 can be made from the same polymer composition. In an alternative embodiment, however, different polymer compositions may be used that have different but complementary properties, such as flexural modulus properties.

As shown in FIG. 1, the boot portion 24 of the ski boot 10 includes grooves 28 that cooperate with ribs 30 on the cuff portion 26 for interlocking the two pieces of the boot together. If desired, the cuff portion 26 can be permanently attached to the boot portion 24 through screws or other attachment devices that may extend from the bottom of the boot and through the two portions.

In the embodiment illustrated in FIGS. 1 and 2, the ski boot 10 includes three buckles. The first buckle 32 is positioned on the toe portion of the ski boot. The second buckle 34, on the other hand, is positioned higher on the ski boot and is intended to secure the ski boot to the lower leg of a wearer. The cuff portion 26 further includes a third buckle 36 that wraps around the ankle of the wearer. The third buckle 36 also further serves to integrate the cuff portion 26 with the boot portion 24.

In accordance with the present disclosure, the outer shell 12 of the ski boot 10 is made from a polymer composition that has stable physical properties at lower temperatures and particularly possesses a rigidity factor of about 2 or less. In one embodiment, the outer shell of the ski boot 10 may be made from the polymer composition and may have a resulting flexural modulus of from about 30 MPa to about 1500 MPa. In high performance applications, a higher flexural modulus may be preferred. For example, the flexural modulus may be greater than about 700 MPa, such as greater than about 800 MPa, such as greater than about 900 MPa. When using a higher flexural modulus polyester polymer or when formulating a polymer composition having a higher flexural modulus, however, abrasion resistance may be adversely affected. Thus, as will be described below, in one embodiment, an abrasion resistant additive may be incorporated into the composition.

Figure 3:
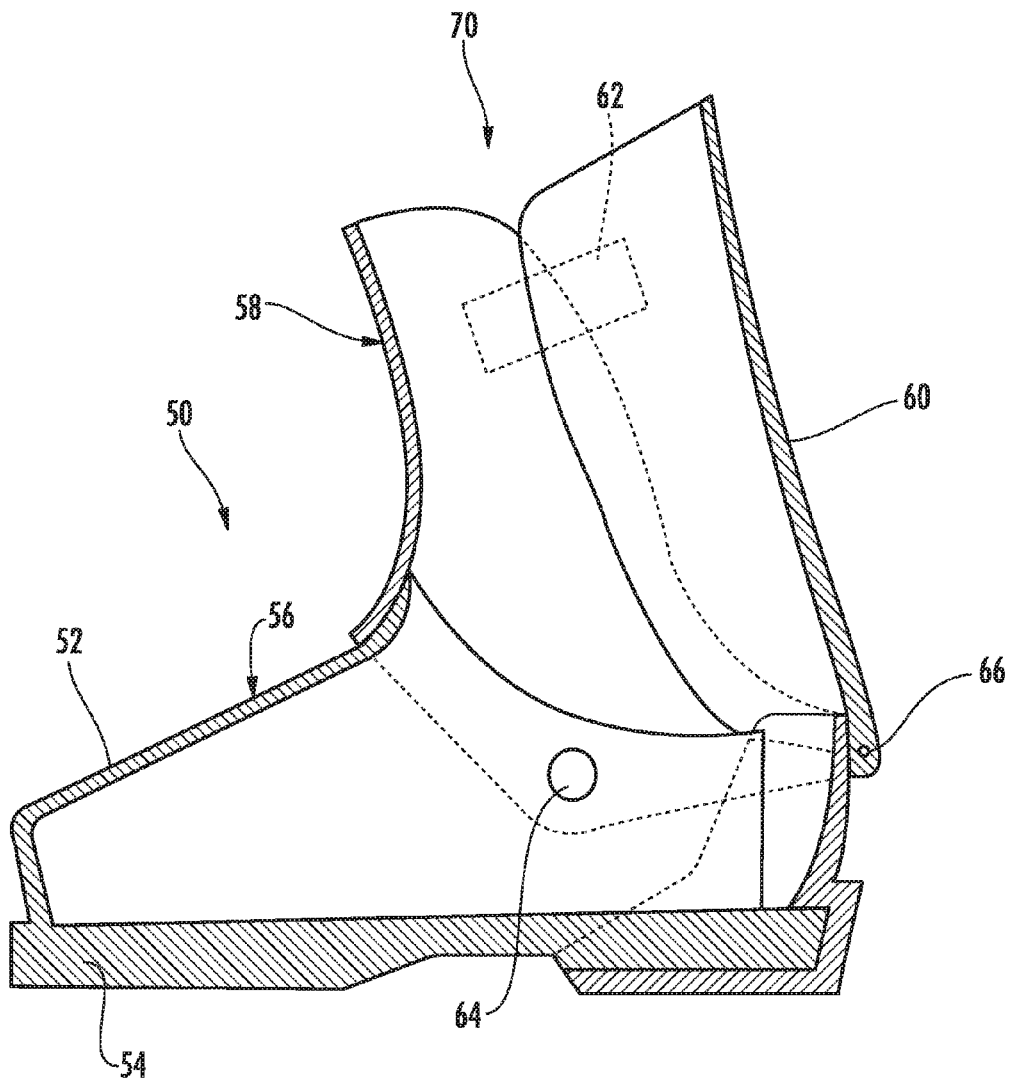
FIG. 3 is a cross-sectional view of another embodiment of a snow ski boot made in accordance with the present disclosure.

Referring to FIG. 3, another embodiment of a ski boot 10 made in accordance with the present disclosure is shown. In this embodiment, a cross-sectional view of the boot is illustrated. The ski boot 50 shown in FIG. 3 is referred to in the art as a "rear entry" ski boot in that the boot includes a rear portion that pivots for allowing one to insert his or her foot.

As shown in FIG. 3, the ski boot 10 includes a rigid outer shell 52 made in accordance with the present disclosure. Not shown, the ski boot 50 may also include a lining that lines the hollow interior cavity of the outer shell 52. The outer shell 52 also defines a sole 54 that has a shape configured to engage the bindings of a ski.

In the embodiment illustrated in FIG. 3, the outer shell 52 of the ski boot 50 is made from multiple parts. The outer shell 52 includes a boot portion 56 attached to a front cuff 58 and to a rear cuff 60. The front cuff 58 and the rear cuff 60 are tightened around a skier's lower leg during use. For instance, in one embodiment, the ski boot 50 may include a buckle 62 for adjustably tightening the front cuff 58 together with the back cuff 60.

The front cuff 58 is pivotally attached to the boot portion 56 about a pivot element 64. The rear cuff 60, on the other hand, may be attached to the boot portion 56 by a pivot element 66. In this manner, the rear cuff 60 can be pivoted backwards to expose an opening 70 for receiving the foot of a wearer.

In the embodiment illustrated in FIG. 3, each of the different sections of the ski boot may be attached to a different finer for providing cushion and comfort to the wearer. Alternatively, a one-piece liner may be inserted into the boot for surrounding the foot and ankle of a wearer.

Similar to the embodiment illustrated in FIGS. 1 and 2, the outer shell 52 of the ski boot 50 is also made with a polymer composition in accordance with the present disclosure. As described above, the polymer composition generally contains a non-elastomeric thermoplastic polymer in combination with various other components. As will be described in greater detail below, the polymer composition of the present disclosure can be formulated to not only be stable at lower temperatures but also have improved abrasion resistance, while keeping other physical properties, such as impact resistance, within desired ranges. The number of different components that are combined with the thermoplastic polymer and the amount of each component can be varied in order to achieve desired flexural modulus and other physical properties within narrow tolerance limits. In one embodiment, the polymer composition is not only stable at lower temperatures but also has excellent impact resistance in combination with excellent abrasion resistance. When used to produce a ski boot, a wearer will get increased performance from the boot across varied temperatures. The boot will also have a longer life span with reduced wear and change in physical properties due to weathering. The wearer will be able to achieve maximum power transfer to the ski from the boot. In addition, the polymer composition is capable of producing lighter articles with thinner walls due to lower densities and higher specific strength.

In one embodiment, the non-elastomeric thermoplastic polymer comprises a non-hygroscopic polymer that does not undergo a second order transition between a temperature range of from about 50° C. to about −40° C. In one embodiment, the thermoplastic polymer comprises a polyester polymer, and particularly an aromatic polyester polymer.

The polyesters which are suitable for use herein are derived from an aliphatic or cycloaliphatic dial, or mixtures thereof, containing from 2 to about 10 carbon atoms and an aromatic dicarboxylic acid, i.e., polyalkylene terephthalates.

Also contemplated herein are the above polyesters with minor amounts of units derived from aliphatic dicarboxylic acids, e.g., of up to about 50 carbon atoms, including cycloaliphatic straight and branched chain acids, such as adipic acid, cyclohexanediacetic acid, dimerized $C_{16}$-$C_{18}$ unsaturated acids (which have 32 to 36 carbon atoms), trimerized acids, and the like.

The polyesters which are derived from a cycloaliphatic dial and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5-naphthalenedicarboxylic acids. In one embodiment, the dicarboxylic acid is terephthalic acid or mixtures of terephthalic and isophthalic acid.

Polyesters that may be used in the polymer composition, for instance, include polyethylene terephthalate, polybutylene terephthalate, and mixtures thereof (which also includes copolymers of the above polymers). The polyester polymer, for instance, may have an intrinsic viscosity (IV) of from about 0.55 to about 0.88.

When incorporating a polyester into the polymer composition, in one embodiment, the polyester can be made so as to have a minimal amount of carboxylic end groups. For instance, in one embodiment, the polyester polymer may undergo solid state polymerization in order to remove carboxylic end groups. For instance, in one embodiment, a polyester polymer is used that contains carboxylic end groups in an amount less than about 30 mmol/kg, such as in an amount less than about 20 mmol/kg, such as in an amount less than about 12 mmol/kg. Ideally, the polyester polymer may contain no carboxylic end groups.

In one embodiment of the present disclosure, the thermoplastic polymer comprises polybutylene terephthalate. The polybutylene terephthalate can be formed by polymerizing a glycol component containing from about 70 mol percent to about 80 mol percent tetramethylene glycol and an acid component comprising terephthalic acid or a derivative ester thereof, such as dimethylterephthalate. The terephthalic acid or derivative ester thereof may comprise at least about 70 mol percent, such as at least about 80 mol percent of the acid component. If desired, minor amounts of other ester components may be used to produce the polyester polymer. For instance, from about 0.5% to about 5% by weight of units derived from aliphatic or other aromatic dicarboxylic acids and/or aliphatic polyols, e.g., glycols, i.e., copolyesters may be present. Among the units which can be present in the copolyesters are those derived from aliphatic dicarboxylic acids which have up to about 50 carbon atoms in the carbon chain and which include straight and branched chain acids, such as adipic acid, dimerized $C_{16}$ to $C_{18}$ unsaturated acids, trimerized such acids, and the like. Minor amounts of other aromatic dicarboxylic acids may be present such as isophthalic acids.

When using a polybutylene terephthalate polymer, various advantages may be obtained. For instance, the polybutylene terephthalate polymer may have excellent color retention, especially when exposed to high temperature aging. A wide variety of pigments and dyes can also be used in conjunction with polybutylene terephthalate.

In an alternative embodiment, the thermoplastic polymer may be combined with a polycarbonate polymer. The polycarbonate polymer may slightly adjust the physical properties of the polyester polymer in a desirable way and/or may improve the ability of the molded article to receive printed matter. Some polycarbonate polymers, however, may be hygroscopic in nature and therefore may not perform as well as some polyester polymers, particularly polybutylene terephthalate.

In one embodiment, an aromatic polycarbonate polymer may be used. Polycarbonates suitable for use can be prepared from dihydroxy compounds according to the structures of the following Formula I or Formula II:

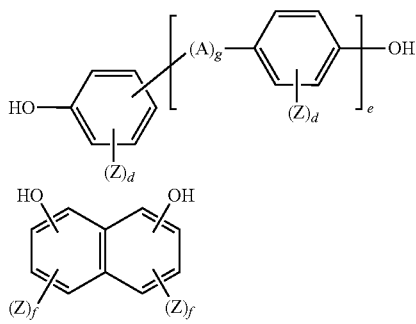

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 6 to 15 carbon atoms, a carbonyl group, an oxygen atom, a sulfur atom, an —SO— or —SO.sub.2-radical or a radical of the general Formula III:

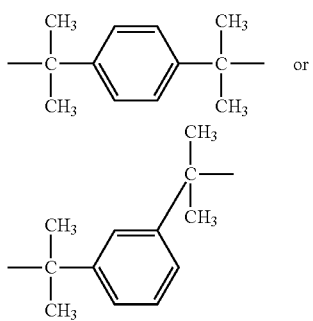

g denotes the number 0 or 1; e denotes the number 0 or 1; Z denotes (in addition to any aromatic H atoms) F, Cl or Br atoms or a $C_{1-3}$ alkyl and if several Z radicals are substituents in one aryl radical, they may be identical or different; d denotes 0 or an integer of from 1 to 4; and f denotes 0 or an integer of from 1 to 3.

Dihydroxy compounds include hydroquinone, resorcinol, bis-(hydroxyphenyl)alkanes, bis-(hydroxyphenyl)cycloalkanes, bis-(hydroxyphenyl)ethers, bis-(hydroxyphenyl)ketones, bis-(hydroxyphenyl)sulfoxides, bis-(hydroxyphenyl) sulfones and α,α-bis-(hydroxyphenyl)diisopropylbenzenes. Further specific examples of suitable dihydroxy compounds are the bisphenols including 2,2-bis-(4-hydroxyphenyl)propane (bisphenol A), 2,4-bis-(4-hydroxyphenyl)-2-methylbutane, 1,1-bis-(4-hydroxyphenyl)cyclohexane, α,α-bis-(4-hydroxyphenyl-p-diisopropylbenzene, 2,2-bis-(3-chloro-4-hydroxyphenyl)propane, 2,2-bis-(3,5-dichloro-4-hydroxyphenyl)propane, 2,2-bis-(3,5-dibromo-4-hydroxyphenyl)propane and 1,1-bis-(4-hydroxyphenyl)-1-phenylethane hydroxybenzophenone and 4,4-sulfonyl diphenol.

The preparation of polycarbonate resins may be carried out in accordance with any of the processes known in the art, for example, by the interfacial polycondensation process, polycondensation in a homogeneous phase or by transesterification.

It should be understood that the inclusion of a polycarbonate polymer in the polymer composition is optional. In fact, in some embodiments, the composition may contain no polycarbonate polymer. For example, the polycarbonate polymer may, in some applications, increase the stiffness of the product and/or increase Tan delta values. Due to higher free volume and internal molecular motions, energy is absorbed in some polycarbonate polymers and hence loss modulus is higher than storage modulus.

The thermoplastic polymer is present in the polymer composition in an amount sufficient to produce a continuous phase within the molded article. For example, the thermoplastic polymer may be present in the polymer composition in an amount of at least about 30% by weight, such as in an amount of at least about 35% by weight, such as in an amount of at least about 40% by weight. The thermoplastic polymer is generally present in an amount less than about 65% by weight, such as in an amount less than about 60% by weight. In one embodiment, for instance, the thermoplastic polymer is present in the polymer composition in an amount from about 30% by weight to an amount of about 65% by weight, such as in an amount from about 35% by weight to an amount of about 60% by weight. The above amounts may refer to a single thermoplastic polymer or to a mixture of thermoplastic polymers.

In one embodiment, two thermoplastic polymers may be combined together that have a different flexural modulus to result in an overall flexural modulus within desired limits.

In one particular embodiment, the thermoplastic polymer may comprise a polybutylene terephthalate polymer. In this embodiment, the polybutylene terephthalate polymer may be present in the polymer composition in an amount sufficient to produce a polymer composition having a flexural modulus of from about 200 MPa to about 600 MPa, such as from about 450 MPa to about 600 MPa.

In an alternative embodiment, a polybutylene terephthalate may be used that has a higher flexural modulus. In this embodiment, the polybutylene terephthalate polymer may be present in the polymer composition in an amount sufficient to produce a polymer composition having a flexural modulus of from about 600 MPa to about 1000 MPa. For instance, the flexural modulus at −20° C. can be greater than about 700 MPa, such as greater than about 800 MPa, such as greater than about 900 MPa. As stated above, the flexural modulus is generally less than about 1500 MPa.

As described above, the one or more thermoplastic polymers are combined with various other components to produce polymer compositions in accordance with the present disclosure. Various components that can be combined with the one or more thermoplastic polymers include thermoplastic elastomers, impact modifiers, reactive modifiers, abrasion additives, colorants, light stabilizers, and the like. Each of the remaining components is optional. In particular, various different components can be selected in combination with other components depending upon the particular application and the desired result. The relative amounts of the components can also vary depending upon the particular application.

In one embodiment, the polymer composition may contain one or more thermoplastic elastomers. The thermoplastic elastomers may include thermoplastic polyester elastomers, thermoplastic polyurethane elastomers, and mixtures thereof.

In one embodiment, the polymer composition may contain a copolyester elastomer such as a segmented thermoplastic copolyester. Useful segmented thermoplastic copolyester elastomers include a multiplicity of recurring long chain ester units and short chain ester units joined head to tail through ester linkages. The long chain units can be represented by the formula

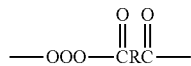

and the short chain units can be represented by the formula

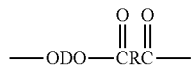

where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 25 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl)methane, p-oxy-(p-carboxyphenyl)benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralenedicarboxylic acid, anthralenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy)benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids, are the cyclohexanedicarboxylic acids and adipic acid.

The dicarboxylic acid may have a molecular weight less than about 300. In one embodiment, phenylene dicarboxylic acids are used such as terephthalic and isophthalic acid.

Included among the low molecular weight (less than about 250) diols which react to form short chain ester units of the copolyesters are acyclic, alicyclic and aromatic dihydroxy compounds. Included are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy)diphenyl, bis(p-hydroxyphenyl) methane, and bis(p-hydroxyphenyl)propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide HOOCCH$_2$(OCH$_2$CH$_2$CH$_2$CH$_2$)$_x$OCH$_2$COOH IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure

.DOCCH$_2$(OCH$_2$CH$_2$CH$_2$CH$_2$)$_x$OCH$_2$COOD$^0$ when only one low molecular weight diol (corresponding to D) is employed. When more than one diol us used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

In general, a thermoplastic polyester elastomer is selected that does not undergo a second order transition throughout a temperature range of from about 23° C. to about −40° C. The thermoplastic elastomer may be present in the composition in an amount from about 10% to about 40% by weight.

Instead of a thermoplastic polyester elastomer or in addition to a thermoplastic polyester elastomer, the polymer composition may also contain various other thermoplastic elastomers, such as a thermoplastic polyurethane elastomer.

Thermoplastic polyurethane elastomers can include segmented block copolymers comprised of hard and soft segments. The hard segments can be aliphatic or aromatic. In general, the hard segments are formed by combining an isocyanate, such as a diisocyanate, with a chain extender, such as a diol. The hard segments present in the thermoplastic polyurethane elastomer provide abrasion resistance.

Most thermoplastic polyurethane elastomers are produced from three basic reactants: a polyol which forms the basis for the soft segments, a diisocyanate and a chain extender. Phase separation occurs in these materials due to the limited miscibility of the hard and soft segments along with a thermodynamic driving force provided by the ability of adjacent hard segment repeat units to form more stable configurations through the process of hydrogen bonding. The basic morphology can be described as soft segments separated from hard segments to form a two-phase structure consisting of hard and soft domains. The soft domains provide the elastomeric behavior, while the hard domains act in a similar manner to provide material rigidity and mechanical strength.

In order to form an aliphatic thermoplastic polyurethane elastomer, the isocyanate used to form the hard segments may comprise an aliphatic isocyanate.

Examples of aliphatic isocyanates include 1,6-hexamethylene diisocyanate, alicyclic diisocyanates such as isophorone diisocyanate, and the like. Other aliphatic isocyanates include metatetramethylxylene diisocyanate, paratetramethylxylene diisocyanate, dibenzyl diisocyanate, xylene diisocyanate, and the like.

Diol chain extenders that may be used to produce the hard segments can include aliphatic dials having from about two carbon atoms to about six carbon atoms in the carbon chain. Particular examples include ethylene glycol, 1,4-butane diol, 1,6-hexane diol, neopentyl glycol, and the like.

The soft segment of the thermoplastic polyurethane elastomer, on the other hand, may be derived from a long-chain diol. The long-chain diol may comprise a polyester diol or a polyether diol. The long-chain diol may comprise polybutylene adipate diol, polyethylene adipate diol, polytetramethylene ether glycol, polypropylene oxide glycol, polyethylene oxide glycol, and the Like.

In one embodiment, the long-chain diol may comprise a diol containing carbonate groups. For instance, the thermoplastic elastomer can be produced as described above by reacting together a polymer dial containing carbonate groups with an aliphatic isocyanate and a chain extender. The polymer diol, for instance, may comprise a polycarbonate diol and/or a polyester polycarbonate diol.

A polycarbonate dial may be produced by reacting a diol with a carbonate compound. The carbonate compound may comprise, for instance, a carbonate compound with alkyl groups, a carbonate compound with alkylene groups, or a carbonate compound containing aryl groups. Particular carbonate compounds include dimethyl carbonate, diethyl carbonate, ethylene carbonate, and/or diphenyl carbonate. A polyester polycarbonate, on the other hand, may be formed by reacting a diol with a carbonate compound as described above in the presence of a carboxylic acid.

The soft segments can be present in the impact modifier in an amount sufficient for the impact modifier to have a Shore A hardness of less than about 95, such as less than about 85, such as less than about 75, such as even less than about 70. In general, the Shore D hardness of the polymer will be greater than about 10, such as greater than about 20. As used herein, Shore A hardness and Shore D hardness are determined according to ISO Test 868.

The amount of the thermoplastic polyurethane elastomer contained in the polymer composition can vary depending upon various factors. For example, the amount of a thermoplastic polyurethane elastomer present in the polymer composition can depend upon the relative amount of the other components. In general, when present, the thermoplastic polyurethane elastomer may be included in the composition in an amount from about 0.1% to about 10% by weight, such as from about 2.5% to about 10% by weight.

In addition to one or more thermoplastic elastomers, the polymer composition may also contain an additive for increasing abrasion resistance. In one embodiment, for instance, particles may be incorporated into the composition that can significantly increase wear resistance. In one embodiment, for instance, the particles may comprise an ultra-high molecular weight polyolefin, such as an ultra-high molecular weight polyethylene.

Treated and untreated ultra-high molecular weight polyethylene may be used in the polymer composition. Surface treated ultra-high molecular weight polyethylene, however, may increase abrasion resistance without adversely affecting impact resistance, especially at lower temperatures. Surface treated ultra-high molecular weight polyethylene, for instance, may have better miscibility or actually form bonds within the polymer matrix.

In one embodiment, the surface treatment may produce a hydrophilized ultra-high molecular weight polyethylene. For example, an exemplary surface treatment method is plasma treatment. The hydrophilized polyethylene comprises homo- or copolymers of ethylene. According to a further embodiment at least 50 mol-%, preferably at least 60 mol-%, more preferably at least 70 mol-% or at least 80 mol-%, especially at least 90 mol-%, at least 95 mol-%, in particular at least 97 mol-% or at least 98.5 mol-% of the total monomer units are ethylene.

In general the surface of the ultrahigh molecular weight polyethylene (UHMW-PE) is hydrophilized by oxidation of the surface. A typical process is the plasma treatment of the surface. According to one embodiment, the hydrophilized ultrahigh molecular weight polyethylene is obtainable or obtained by a plasma treatment of a ultrahigh molecular weight polyethylene. The hydrophilized UHMW-PE surface may comprise groups selected from the group —OH (Hydroxy), —OOH (Hydroperoxo), —NH$_2$ (Amino), —COOH (Carboxyl), —COOOH (Peracid), —CHO (Aldehyde), etc. The degree of hydrophilization of the UHMW-PE can be adjusted by the time and the conditions of the treatment as well as the particle size of the UHMW-PE.

Methods to obtain hydrophilized UHMW-PE are described in U.S. Pat. No. 5,977,229 which is herein incorporated by reference.

In one embodiment, the hydrophobic surface of an ultra-high molecular weight polyethylene is treated with a mixture comprising 1 to 99.9% by weight of at least one water soluble wetting agent and 0.1 to 99% by weight of at least one water insoluble wetting agent. Preferably, a water soluble alkane sulfonate and polyglycol ether, such as polypropylene glycol monobutyl ether is used.

In a further embodiment the surface of the UHMW-PE can be hydrophilized by reacting the surface of the UHMW-PE with a monomer comprising an unsaturated group and which is capable of reacting with the surface and attaching polyethylene glycol or polypropylene glycol to the modified surface.

The unsaturated monomer can be reacted with the surface by irradiation, i.e. with an electron beam.

The hydrophilized UHMW-PE may further be characterized by having an acid number of from about more than 0.5 mg KOH/g, preferably about more than 1.0 mg KOH/g, further preferably about 1.5 to about 20 mg KOH/g according to ASTM D 1386. The acid number may provide a measure of the extent of hydrophilization or oxidation of the UHMW-PE.

The hydrophilized UHMW-PE may be in the form of a powder, such as a micro powder. The hydrophilized UHMW-PE generally has a mean particle diameter D$_{50}$ (volume based and determined by light scattering) in the range of 1 to 500 μm.

According to one embodiment, the hydrophilized ultrahigh molecular weight polyethylene has a mean particle diameter D$_{50}$ ranging from 20 to 120 μm. In one embodiment, the mean particle diameter of the ultrahigh molecular weight polyethylene is less than about 80 microns, such as less than about 70 microns, such as less than about 60 microns, such as less than about 50 microns. For example, in one embodiment, the mean particle diameter can be from about 20 microns to about 50 microns, such as from about 20 microns to about 40 microns.

The ultrahigh molecular weight polyethylene particles can also have a spherical shape or an irregular shape. As used herein, an irregular shape refers to a particle that is non-spherical and may contain lobes and/or hills and valleys. For instance, the particles may have a popcorn-like shape. In one embodiment, irregular-shaped particles are incorporated into the polymer composition. Better physical and mechanical bonding with the polymer matrix may occur when using irregular-shaped particles which allows for increased abrasion resistance while minimizing any adverse effects on impact resistance.

The ultrahigh molecular weight polyethylene can have an average molecular weight of higher than about $1.0 \cdot 10^6$ g/mol, such as higher than about $2.0 \cdot 10^6$ g/mol, such as higher than about $4.0 \cdot 10^6$ g/mol, especially having an average molecular weight ranging from about $1.0 \cdot 10^6$ g/mol to about $15.0 \cdot 10^6$ g/mol, such as ranging from about $3.0 \cdot 10^6$ g/mol to about $12.0 \cdot 10^6$ g/mol, determined by viscosimetry. Molecular weight may be calculated by way of the Mark-Houwink equation if so desired.

The viscosity number of the ultrahigh molecular weight polyethylene can be higher than 1000 ml/g, such as higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

Suitable hydrophilized UHMW-PE is commercially available from Ticona GmbH, Germany under the tradename GUR®.

The hydrophilized ultrahigh molecular weight polyethylene can be present in the polymer composition in an amount generally from about 0.5% to about 10% by weight, such as from about 1% to about 5% by weight.

In addition to the above components, the polymer composition may also contain one or more impact modifiers. In one embodiment, for instance, an impact modifier may be added that comprises a diene-based elastomer.

In one embodiment, for instance, the impact modifier may comprise a core-shell modifier that includes an elastomeric core surrounded by a thermoplastic shell. The core, for instance, may comprise a crosslinked diene-based elastomer. The particle size of the impact modifier may generally range from about 0.002 microns to about 50 microns. The impact modifier increases impact strength while also reducing the temperature dependency of the flexural modulus.

The impact modifiers may contain both a rubbery component and a grafted rigid phase component. The impact modifiers may be prepared by grafting a (meth)acrylate and/or a vinyl aromatic polymer, including copolymers thereof such as styrene/acrylonitrile, onto the selected rubber. In one embodiment, the graft polymer is a homo- or copolymer of methylmethacrylate.

The rubber or elastomeric material can be, for example, one or more of the butadiene-, butyl acrylate-, or EPDM-types. The impact modifier can contain at least about 40 weight percent of the rubber material, such as at least about 45 and, in one embodiment, at least about 60 weight percent of the rubber material. The impact modifier can contain up to 100 weight percent elastomer (no rigid phase) and may contain less than 95 weight percent of the elastomer, such as less than 90 weight percent of the elastomer with the balance being a rigid phase polymer of which at least a portion is graft polymerized and/or crosslinked around or to the elastomer.

In one embodiment, the impact modifier contains as an elastomer a substrate polymer latex or core which is made by polymerizing a conjugated diene, or by copolymerizing a conjugated diene with a mono-olefin or polar vinyl compound, such as styrene, acrylonitrile or methyl methacrylate. The substrate rubber is typically made up of about 45 to 100 percent conjugated diene and up to about 55 percent of the mono-olefin or polar vinyl compound. A mixture of monomers is then graft polymerized to the substrate latex. A variety of monomers may be used for this grafting purpose, including vinyl aromatic compounds such as styrene, vinyl toluene, alpha-methyl styrene, halogenated styrene, naphthalene; acrylonitriles including methacrylonitrile or alpha-halogenated acrylonitrile; or a C1-C8 alkyl (meth)acrylate such as methyl acrylate, ethylacrylate, hexyl acrylate, methyl methacrylate, ethyl methacrylate or hexyl methacrylate; an acrylic or methacrylic acid; or a mixture of two or more of the foregoing. The extent of grafting is sensitive to the substrate latex particle size and grafting reaction conditions, and particle size may be influenced by controlled coagulation techniques among other methods. The rigid phase may be crosslinked during the polymerization by incorporation of various polyvinyl monomers such as divinyl benzene and the like.

The grafting monomers may be added to the reaction mixture simultaneously or in sequence, and, when added in sequence, layers, shells or wart-like appendages can be built up around the substrate latex, or core. The monomers can be added in various ratios to each other. A typical weight ratio for a methacrylate-butadiene-styrene (MBS) elastomer is about 60 to 80 parts by weight substrate butadiene polymer rubber latex, about 40 to 20 parts by weight grafted methyl methacrylate polymer.

In one embodiment, the impact modifier comprises an MBS material that includes a graft copolymer formed between a butadiene polymer core and at least one vinyl monomer such as a derivative of acrylic or methacrylic acid. The butadiene may account for from about 50 mol percent to about 75 mol percent of the total polymer. In one embodiment, more than one vinyl monomer is grafted to the butadiene elastomer. For instance, in one embodiment, a three-stage polymer is used having a butadiene-based core, a second-stage polymerized from styrene and a final stage or shell polymerized from methylmethacrylate and 1,3-butylene glycol dimethacrylate. In one embodiment, the M:B:S ratio can be about 15:70:15.

In general, the impact modifier is present in the polymer composition in an amount of greater than about 10% by weight, such as in an amount greater than 15% by weight, such as in an amount greater than about 18% by weight. The above impact modifier may be present in an amount of generally less than about 30% by weight, such as in an amount less than about 25% by weight.

Block copolymers of butadiene and vinyl aromatic hydrocarbons may also be utilized as the impact modifier and include any of those which exhibit elastomeric properties. Such block copolymers may be multiblock copolymers of varying structures containing various ratios of butadiene to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A-B, A-B-A, A-B-A-B, B-A-B, $(AB)_{1,2,3}$ . . . BA and the like wherein A is a polymer block of vinyl aromatic hydrocarbon or a conjugated diene/vinyl aromatic hydrocarbon tapered copolymer block and B is a polymer block of butadiene.

The butadiene block includes 1,3-butadiene, 2-methyl-1,3-butadiene (isoprene), 2,3-dimethyl,-1,3-butadiene, and the like. Mixtures may also be used.

Vinyl aromatic hydrocarbons which may be utilized to prepare copolymers included styrene, o-methylstyrene, p-methylstyrene, p-tert-butylstyrene, 1,3-dimethylstyrene, p-methylstyrene, alpha-methylstyrene, vinylnaphthalene, vinylanthracene and the like.

The block copolymers are typically hydrogenated prior to incorporation into the polyesters. The hydrogenation of these polymers and copolymers may be carried out by a variety of well established processes including hydrogenation in the presence of such catalysts as Raney Nickel, noble metals such as platinum, palladium and the like and soluble transition metal catalysts. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

The block copolymers may also be grafted such as with maleic anhydride.

In one embodiment, the polymer composition may also contain a reactive modifier, which may also serve as an impact modifier. The reactive modifier may be included in the composition for reacting with one or more components. In one embodiment, for instance, a reactive modifier may be used that reacts with the surface of the ultrahigh molecular weight polyethylene particles and may also react with other components, such as the non-elastomeric thermoplastic polymer. In this manner, the ultrahigh molecular weight polyethylene particles are further integrated into the polymer matrix and thus offer improved abrasion resistance without adversely affecting impact resistance.

In one embodiment, the reactive modifier can be an ethylene copolymer or terpolymer or an ethylene propylene copolymer or terpolymer. By way of example, the non-aromatic reactive modifier can include ethylenically unsaturated monomer units have from about 4 to about 10 carbon atoms. In addition, the non-aromatic reactive modifier can be modified with a mole fraction of from about 0.01 to about 0.5 of one or more of the following: an $\alpha,\beta$ unsaturated dicarboxylic acid or salt thereof having from about 3 to about 8 carbon atoms; an $\alpha,\beta$ unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulphonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of such non-aromatic reactive modifiers that may be used include ethylene-acrylic acid copolymer, ethylene-maleic anhydride copolymers, ethylene-alkyl (meth)acrylate-maleic anhydride terpolymers, ethylene-alkyl (meth)acrylate-glycidyl (meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, etc. In one embodiment, for instance, the reactive modifier can be a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

The reactive modifier may be linear or branched, may be a homopolymer or copolymer (e.g., random, graft, block, etc.), and may contain epoxy functionalization in any portion of the polymer, e.g., terminal epoxy groups, skeletal oxirane units, and/or pendent epoxy groups. For instance, the reactive modifier may be a copolymer including at least one monomer component that includes epoxy functionalization. The monomer units of the reactive modifier may vary. In one embodiment, for example, the reactive modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the reactive modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the reactive modifier. Examples of other monomers may include, for example, ester monomers, olefin monomers, amide monomers, etc. In one embodiment, the non-aromatic reactive modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in a reactive modifier that includes epoxy functionalization can include monomers that do not include epoxy functionalization, as long as at least a portion of the monomer units of the polymer are epoxy functionalized.

In one embodiment, the reactive modifier can be a terpolymer that includes epoxy functionalization. For instance, the reactive modifier can include a methacrylic component that includes epoxy functionalization, an α-olefin component, and a methacrylic component that does not include epoxy functionalization. For example, the reactive modifier may be poly(ethylene-co-methylacrylate-co-glycidyl methacrylate), which has the following structure:

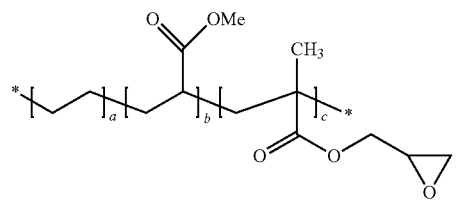

wherein, a, b, and c are 1 or greater.

The relative proportion of the various monomer components of a copolymeric reactive modifier is not particularly limited. For instance, in one embodiment, the epoxy-functional methacrylic monomer components can form from about 1 wt. % to about 25 wt. %, or from about 2 wt. % to about 20 wt % of a copolymeric non-aromatic reactive modifier. An α-olefin monomer can form from about 55 wt. % to about 95 wt. %, or from about 60 wt. % to about 90 wt. %, of a copolymeric non-aromatic reactive modifier. When employed, other monomeric components (e.g., a non-epoxy functional methacrylic monomers) may constitute from about 5 wt. % to about 35 wt. %, or from about 8 wt. % to about 30 wt. %, of a compolymeric non-aromatic reactive modifier.

A reactive modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

When present, the reactive modifier can be included in the polymer composition in an amount less than about 8% by weight, such as in an amount less than about 6% by weight, such as in an amount of less than about 4% by weight. When present, the reactive modifier may be included in the polymer composition in an amount greater than about 0.5% by weight, such as in an amount greater than about 1% by weight.

Other reactive impact modifiers that may be used, have a core and shell construction, with reactive groups on the shell. The core can comprise a crosslinked diene-based elastomer while the shell may comprise a thermoplastic polymer such as a functionalized methacrylate co-polymer. In one embodiment, the impact modifier has a glycidyl methacrylate 1 methylmethacrylate-butadiene-styrene construction (e.g. Durastrength 400R).

In addition to the above components, the polymer composition may include various other ingredients. Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

Still another additive that may be present in the composition is an antioxidant, such as a sterically hindered phenol compound. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). In one embodiment, for instance, the antioxidant comprises tetrakis[methylene(3,5-di-tert-butyl-4-hydroxyhydrocinnamate)]methane. The antioxidant may be present in the composition in an amount less than 2% by weight, such as in an amount from about 0.1 to about 1.5% by weight Light stabilizers that may be present in the composition include sterically hindered amines. Such compounds include 2,2,6,6-tetramethyl-4-piperidyl compounds, e.g., bis(2,2,6,6-tetramethyl-4-piperidyl)sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). UV stabilizers or absorbers that may be present in the composition include benzophenones or benzotriazoles.

In one embodiment, the polymer composition may contain a blend of stabilizers that produce ultraviolet resistance and color stability. The combination of stabilizers may allow for products to be produced, such as ski boots, that have bright and fluorescent colors. In addition, bright colored products can be produced without experiencing significant color fading over time. In one embodiment, for instance, the polymer composition may contain a combination of a benzotriazole light stabilizer and a hindered amine light stabilizer, such as an oligomeric hindered amine. The light stabilizers may be present in an amount from about 0.1% to about 3% by weight, such as from about 0.5% to about 1.5% by weight.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm.

Various other stabilizers may also be present in the composition. For instance, in one embodiment, the composition may contain a phosphite. For instance, in one embodiment, the phosphite compound may comprise distearyl pentaerythritol diphosphite.

In order to produce molded articles in accordance with the present disclosure, the different components of the polymer composition can be dry blended together in a drum tumbler or in a high intensity mixer. The premixed blends can then be melt blended and extruded as pellets. The pellets can then be used in an injection molding process.

The flexural modulus of the polymer composition may generally range from about 200 MPa to about 1000 MPa, such as from about 350 MPa to about 900 MPa. In one embodiment, the flexural modulus can be from about 400 MPa to about 450 MPa. In an alternative embodiment, the flexural modulus may be from about 650 MPa to about 850 MPa.

The present disclosure may be better understood with reference to the following examples.

Example No. 1

The following polymer compositions were formulated and dry blended together in a drum tumbler.

| | Sample No. 1 | Sample No. 2 | Sample No. 3 | Sample No. 4 |
|---|---|---|---|---|
| Polybutylene terephthalate (PBT) | 53 | 38 | 38 | 38 |
| Polyester elastomer (TPE-E) | 15 | 23 | 23 | 27 |
| Polycarbonate (PC) | 10 | 10 | 10 | 10 |
| Methacrylate-butadiene-styrene (MBS) impact modifier | 19.1 | 19.1 | 19.1 | 19.1 |
| Hindered phenol antioxidant | 0.7 | 0.7 | 0.7 | 0.7 |
| Polyester elastomer combined with carbon black particles | 2 | 2 | 2 | 2 |
| Thermoplastic polyurethane elastomer (TPU) | | | 5 | |
| Phosphite antioxidant | 0.2 | 0.2 | 0.2 | 0.2 |
| Hydrophilized ultrahigh molecular weight polyethylene (UHMW PE) particles (60 microns) | | 5 | | |
| Random terpolymer of ethylene, methylacrylate, and glycidyl methacrylate | | 2 | | |
| Ultrahigh molecular weight polyethylene particles (30 microns) | | | 2.5 | |
| Benzotriazol light stabilizer | | | | 1 |
| Hindered amine light stabilizer (HALS) | | | | 1 |

The premixed ingredients were melt-blended and extruded as pellets in a WLE-25 extruder having a SC-202 screw design under the following temperature settings:

| Barrel Zone | Temp. Setting (° C.) |
|---|---|
| 1 | 235-250 |
| 2 | 235-250 |
| 3 | 235-250 |
| 4 | 235-250 |
| 5 | 240-255 |
| 6 | 240-260 |
| Die head temp | 245 |
| Melt Temp | 265 |

The melt temperature was set at about 260° C. The screw speed was set at, for example 375 RPM with 50% torque. A typical die vacuum was 20 mm of Hg and throughput was 50 lbs/hr.

Each of the formulations was conventionally injection molded after drying of pellets at 120 C for 4 hr. for example using a 4 oz. Demag 661 molding machine. The temperature settings were as follows:

| Zone | Temperature Setting (° C.) |
|---|---|
| Rear Barrel | 235-250 |
| Middle Barrel | 235-250 |
| Front Barrel | 240-255 |
| Nozzle | 240-260 |
| Melt | 235-260 |
| Moveable Mold | 30-50 |
| Stationary Mold | 30-50 |

The following results were obtained:

| | Sample No. 1 | Sample No. 2 | Sample No. 3 | Sample No. 4 |
|---|---|---|---|---|
| Polybutylene terephthalate | 53 | 38 | 38 | 38 |
| Polyester elastomer | 15 | 23 | 22.5 | 27 |
| Polycarbonate | 10 | 10 | 10 | 10 |
| Methacrylate-butadiene-styrene impact modifier | 19.1 | 19.1 | 19.1 | 19.1 |

-continued

|  | Sample No. 1 | Sample No. 2 | Sample No. 3 | Sample No. 4 |
|---|---|---|---|---|
| Hindered phenol antioxidant | 0.7 | 0.7 | 0.7 | 0.7 |
| Polyester elastomer combined with carbon black particles | 2 | 2 | 2 | 2 |
| Diphosphite antioxidant | 0.2 | 0.2 | 0.2 | 0.2 |
| Thermoplastic polyurethane elastomer |  |  | 5 |  |
| Hydrophilized ultrahigh molecular weight polyethylene particles (60 microns) |  | 5 |  |  |
| Random terpolymer of ethylene, methylacrylate, and glycidyl methacrylate |  | 2 |  |  |
| Ultrahigh molecular weight polyethylene particles (30 microns) |  |  | 2.5 |  |
| Benzotriazol light stabilizer |  |  |  | 1 |
| Hindered amine light stabilizer |  |  |  | 1 |
| Flex Modulus (23 C.) | 979 | 688 | 703 | 629 |
| Flex Modulus (−20 C.) | 1311 | 993 | 991 | 946 |
| ISO Tensile Modulus(23 C.) | 1013 | 603 | 642 | 549 |
| ISO Tensile Strain-yield | 12.73 | 260.38 | 344.34 | 358.36 |
| ISO Tensile Stress-yield | 25.94 | 26.05 | 31 | 27.63 |
| Notched Charpy (23 C.) | 90.5 | 71.5 | 64.2 | 88.6 |
| Notched Charpy (−30 C.) | 89.6 | 44.3 | 15.9 | 102 |
| Hardness-Shore D | 72.2 | 63.6 | 63.5 | 63.5 |
| Static-COF |  | 0.49 | 0.46 | 0.45 |
| Dynamic-COF |  | 0.47 | 0.35 | 0.45 |

In the above table, flexural modulus was determined according to ISO Test 178, while the tensile tests were measured according to ISO Test 527. ISO Test 179 was used to determine notched Charpy results.

In addition to the above, the following compositions were formulated and tested for abrasion resistance.

|  | Sample No. 5 | Sample No. 6 | Sample No. 7 | Sample No. 8 | Sample No. 9 | Sample No. 10 |
|---|---|---|---|---|---|---|
| Polybutylene terephthalate | 63.4 | 50.4 | 51.4 | 51.4 | 51.4 | 51.4 |
| Polyester elastomer | 12 | 25 | 20 | 32 | 32 | 32 |
| Methacrylate-butadiene-styrene impact modifier | 19 | 19 | 19 | 19 | 19 | 19 |
| Hindered phenol antioxidant | 0.5 | 0.5 | 0.5 | 0.5 | 0.5 | 0.5 |
| Thermoplastic polyurethane elastomer |  |  | 5 | 5 | 5 | 5 |
| Phosphite antioxidant | 0.2 | 0.2 | 0.2 | 0.2 | 0.2 | 0.2 |
| Random terpolymer of ethylene, methylacrylate, and glycidyl methacrylate | 1 | 1 |  |  |  |  |
| Hydrophilized ultrahigh molecular weight polyethylene particles (60 microns) |  |  |  |  | 2.5 |  |
| Ultrahigh molecular weight polyethylene particles (30 microns) |  |  | 2.5 |  |  |  |
| Benzotriazol light stabilizer | 0.7 | 0.7 | 0.7 | 0.7 | 0.7 | 0.7 |
| Hindered amine light stabilizer | 0.7 | 0.7 | 0.7 | 0.7 | 0.7 | 0.7 |
| Hydrophilized ultrahigh molecular weight polyethylene particles (30 microns) | 2.5 | 2.5 |  | 2.5 |  | 5 |
| ABRASION DIN-53516 | 94 | 60 | 67 | 65 | 62 | 69 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A cold weather and wear-resistant polymer composition comprising:
    a non-elastomeric polyester polymer present in the composition in an amount sufficient to form a continuous phase in an article molded from the polymer composition;
    ultra-high molecular weight polyethylene blended with the polyester polymer, the ultra-high molecular weight polyethylene comprising hydrophilized particles, and wherein the particles have been plasma treated;
    at least one impact modifier;
    at least one thermoplastic elastomer; and
    wherein the polymer composition is formulated so as to have a rigidity factor of about 2 or less and in order to have an abrasion resistance according to Test DIN 53516 of less than about 95 mm$^3$.

2. A polymer composition as defined in claim 1, wherein the non-elastomeric polyester polymer comprises polybutylene terephthalate.

3. A polymer composition as defined in claim 1, wherein the non-elastomeric polyester polymer contains less than about 30 mmol/kg of carboxylic groups.

4. A polymer composition as defined in claim 1, wherein the impact modifier has a core and shell construction, the core comprising a cross-linked diene-based elastomer, the shell comprising a thermoplastic polymer.

5. A polymer composition as defined in claim 1, wherein the hydrophilized particles have a mean particle diameter of from about 20 microns to about 60 microns and have an irregular shape.

6. A polymer composition as defined in claim 5, wherein the ultra-high molecular weight polyethylene has an average molecular weight of greater than about $1\times10^6$ g/mol.

7. A polymer composition as defined in claim 1, wherein the at least one thermoplastic elastomer present in the composition comprises a thermoplastic polyester elastomer, a thermoplastic polyurethane elastomer, or combinations thereof.

8. A polymer composition as defined in claim 1, wherein the at least one thermoplastic elastomer comprises a thermoplastic polyurethane elastomer, the thermoplastic polyurethane elastomer having a Shore A hardness of less than 95.

9. A polymer composition as defined in claim 8, wherein the polymer composition further comprises a thermoplastic polyester elastomer.

10. A polymer composition as defined in claim 1, wherein the non-elastomeric polyester polymer comprises a polybutylene terephthalate containing less than about 30 mmol/kg of carboxylic groups, the impact modifier having a core and shell construction and being present in the polymer composition in an amount from about 10% to about 30% by weight, the ultra-high molecular weight polyethylene being present in the polymer composition in an amount from about 0.5% to about 10% by weight, the at least one thermoplastic elastomer comprising a thermoplastic polyester elastomer being present in the polymer composition in an amount from about 10% to about 40% by weight.

11. A polymer composition as defined in claim 10, further comprising a polyester polyurethane elastomer.

12. A polymer composition as defined in claim 10, further comprising a reactive modifier, the reactive modifier comprising an ethylene-maleic anhydride copolymer, an ethylene-alkyl (meth)acrylate-maleic anhydride copolymer, or an ethylene-alkyl (meth)acrylate-glycidyl (meth)acrylate copolymer, or has a core and shell construction, with reactive groups on the shell.

13. A molded product comprising:
an article molded from a polymer composition, the polymer composition comprising a non-elastomeric polyester polymer, ultra-high molecular weight polyethylene particles, at least one impact modifier, and a thermoplastic elastomer, the thermoplastic elastomer comprising a thermoplastic polyester elastomer being present in the polymer composition in an amount from about 10% to about 40% by weight, the polymer composition further containing a thermoplastic polyurethane elastomer, the polymer composition being formulated such that the polymer composition has a rigidity factor of about 2 or less and has an abrasion resistance according to Test DIN 53516 of less than about 95 mm$^3$, the polymer composition also having a flexural modulus of greater than about 700 MPa.

14. A molded product as defined in claim 13, wherein the non-elastomeric polyester polymer comprises polybutylene terephthalate containing less than about 30 mmol/kg of carboxylic acid groups.

15. A molded product as defined in claim 14, wherein the ultra-high molecular weight polyethylene comprises hydrophilized particles having a particle size such that the average diameter is from about 20 microns to about 60 microns, the particles being present in the polymer composition in an amount from about 0.5% to about 10% by weight and having an irregular shape.

16. A molded product as defined in claim 13, wherein the impact modifier comprises a core and shell construction, the core comprising a cross-linked diene-based elastomer, the shell comprising a thermoplastic polymer.

17. A molded product as defined in claim 13, wherein the thermoplastic polyurethane elastomer having a Shore A hardness of less than about 95.

18. A molded product comprising:
an article molded from a polymer composition, the polymer composition comprising a non-elastomeric polyester polymer, ultra-high molecular weight polyethylene particles, at least one impact modifier, and a thermoplastic elastomer, the polymer composition being formulated such that the polymer composition has a rigidity factor of about 2 or less and has an abrasion resistance according to Test DIN 53516 of less than about 95 mm$^3$, the polymer composition also having a flexural modulus of greater than about 700 MPa, the thermoplastic elastomer comprising a thermoplastic polyester elastomer, the thermoplastic polyester elastomer being present in an amount from about 10% to about 40% by weight, the polymer composition further comprising a reactive modifier, and wherein the ultra-high molecular weight polyethylene particles have been plasma treated.

19. A molded product as defined in claim 18, wherein the reactive modifier comprises an ethylene-maleic anhydride copolymer, an ethylene-alkyl (meth)acrylate-maleic anhydride copolymer, or an ethylene-alkyl (meth)acrylate-glycidyl (meth)acrylate copolymer, or has a core and shell construction, with reactive groups on the shell.

20. A molded product as defined in claim 13, wherein the molded product comprises a boot having a rigid outer shell, the rigid outer shell being formed from the polymer composition.

21. A molded product as defined in claim 20, wherein the boot comprises a snow skiing boot, the outer shell including at least one flange for attachment to ski bindings.

22. A molded product as defined in claim 13, wherein the molded product comprises a snow shoe.

23. A molded product as defined in claim 13, wherein the molded product comprises sporting equipment.

24. A molded product as defined in claim 13, wherein the molded product comprises snow removal equipment.

25. A molded product as defined in claim 13, wherein the molded product comprises a part for a snowmobile.

26. A molded product as defined in claim 13, wherein the molded product comprises irrigation equipment or agriculture equipment.

* * * * *